United States Patent
Mitra et al.

(10) Patent No.: US 11,098,192 B2
(45) Date of Patent: Aug. 24, 2021

(54) COMPOSITION COMPRISING A (METH)ACRYLIC POLYMER AND POLYCARBONATE

(71) Applicant: SABIC GLOBAL TECHNOLOGIES B.V., Bergen Op Zoom (NL)

(72) Inventors: Susanta Mitra, Bangalore (IN); Sharmila Muthukrishnan, Geleen (NL); Bander Al-Farhood, Riyadh (SA); Debasish Banerjee, Bangalore (IN); Chandrashekhar Lingannaiah, Geleen (NL); Sadasivam Gopalakrishnan, Bangalore (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 80 days.

(21) Appl. No.: 16/471,344

(22) PCT Filed: Dec. 18, 2017

(86) PCT No.: PCT/EP2017/083205
§ 371 (c)(1),
(2) Date: Jun. 19, 2019

(87) PCT Pub. No.: WO2018/114743
PCT Pub. Date: Jun. 28, 2018

(65) Prior Publication Data
US 2020/0115547 A1      Apr. 16, 2020

(30) Foreign Application Priority Data
Dec. 21, 2016   (EP) .................................. 16205793

(51) Int. Cl.
*C08L 69/00* (2006.01)
*C08L 33/12* (2006.01)
*C08L 71/02* (2006.01)

(52) U.S. Cl.
CPC ............. *C08L 69/00* (2013.01); *C08L 33/12* (2013.01); *C08L 71/02* (2013.01); *C08L 2203/30* (2013.01); *C08L 2205/03* (2013.01)

(58) Field of Classification Search
CPC ...... C08L 69/00; C08L 33/12; C08L 2203/30; C08L 2205/03; C08L 71/02
See application file for complete search history.

(56) References Cited

U.S. PATENT DOCUMENTS

| 5,599,863 A | 2/1997 | Zimmerman |
| 8,772,401 B2 * | 7/2014 | Kwon ..................... C08L 69/00 524/508 |
| 2008/0214731 A1 | 9/2008 | Li |
| 2011/0112240 A1 * | 5/2011 | Krauter .................. C08L 69/00 524/540 |

FOREIGN PATENT DOCUMENTS

| WO | 2016200032 A1 | 12/2016 |
| WO | WO 2016/200032 A1 * | 12/2016 |

OTHER PUBLICATIONS

European Search Report; European Application No. 16205793.9; International Filing Date: Dec. 21, 2016; 2 pages.
International Search Report; International Application No. PCT/EP2017/083205; International Filing Date: Dec. 18, 2017; dated Aug. 1, 2018; 3 pages.
Written Opinion; International Application No. PCT/EP2017/083205; International Filing Date: Dec. 18, 2017; dated Aug. 1, 2018; 5 pages.

* cited by examiner

*Primary Examiner* — Robert D Harlan
(74) *Attorney, Agent, or Firm* — Cantor Colburn LLP

(57) ABSTRACT

The present invention relates to a polymer composition comprising—polycarbonate; -(meth)acrylic polymer; and-≥1.0 and ≤10.0 wt % polyalkylene glycol with regard to the total weight of the polymer composition. Such polymer composition can be produced by for example a conventional compounding process using melt extrusion, wherein polycarbonates and PMMA can be converted into a polymer composition having the desired properties without need for using dedicated process equipment.

13 Claims, No Drawings

COMPOSITION COMPRISING A (METH)ACRYLIC POLYMER AND POLYCARBONATE

CROSS REFERENCE TO RELATED APPLICATIONS

This application is a 371 of International Application No. PCT/EP2017/083205, filed Dec. 18, 2017, which is incorporated by reference in its entirety, and which claims priority to European Application Serial No. 16205793.9, filed Dec. 21, 2016.

The present invention relates to a polymer composition comprising a (meth)acrylic polymer and polycarbonate.

Polycarbonates as well as (meth)acrylic polymers such as polymethylmethacrylate (PMMA) are well known polymers that each have a set of properties that render them suitable for a large variety of applications. Both materials have for example a high degree of transparency, as a result of which they both find use in applications where a thermoplastic material having such transparency is the material of choice.

Each of both polycarbonate and PMMA also have their unique properties as a result of which each of them finds use in certain applications where particularly those properties are in desire. For example, polycarbonate has a high impact strength and excellent thermal properties, whereas PMMA is known for its excellent scratch resistance and weatherability.

For certain applications, it would be quite desirable to have access to a thermoplastic material that combines the impact strength and thermal properties of polycarbonate and the scratch resistance and weatherability of PMMA.

Achieving such has been attempted in the form of for example copolymers of polycarbonate and PMMA. A disadvantage hereof is that to obtain such products, a designated polymerisation process needs to be performed, which in commercial practise involves a dedicated investment in equipment and process operation. Alternatively, compatibilisation via addition of a transesterification catalyst has been suggested; however this leads to a disadvantage in that the catalyst needs to be recovered from the product. Another solution that has been investigated is via solution blending, but in such process the need for recovery of solvents lead to undesired efforts to be undertaken and potentially a higher environmental impact of the process.

It is therefore a desire to be able to have access to a thermoplastic material having desired balance of properties without need to produce such material in a dedicated polymerisation process.

This has now been achieved according to the present invention by a polymer composition comprising
  polycarbonate;
  (meth)acrylic polymer; and
  ≥1.0 and ≤10.0 wt % polyalkylene glycol
with regard to the total weight of the polymer composition.

Such polymer composition can be produced by for example a conventional compounding process using melt extrusion, wherein polycarbonates and PMMA can be converted into a polymer composition having the desired properties without need for using dedicated process equipment.

The (meth)acrylic polymer preferably is a polymer comprising ≥95.0% by weight of polymer units according to formula I, with regard to the total weight of the (meth)acrylic polymer:

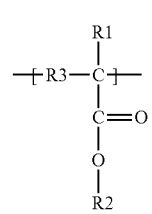

formula I in which:
R1 is hydrogen or a methyl moiety;
R2 is a hydrocarbon moiety comprising 1-4 carbon atoms;
R3 is a hydrocarbon moiety comprising 1-4 carbon atoms;

The (meth)acrylic polymer may for example be a polymer prepared using ≥95.0% by weight, more preferably ≥98.0% or ≥99.0% by weight, with regards to the total weight of the monomers used, of one or more monomers selected from methyl acrylate, methyl-2-methyl acrylate, methyl-2-ethyl acrylate, methyl-2-propyl-acrylate, methyl-2-butyl acrylate, ethyl acrylate, ethyl-2-methyl acrylate, ethyl-2-ethyl acrylate, ethyl-2-propyl acrylate, ethyl-2-butyl acrylate, propyl acrylate, propyl-2-methyl acrylate, propyl-2-ethyl acrylate, propyl-2-propyl acrylate, propyl-2-butyl acrylate, butyl acrylate, butyl-2-methyl acrylate, butyl-2-ethyl acrylate, butyl-2-propyl acrylate, butyl-2-butyl acrylate, t-butyl-2-methyl acrylate, isobutyl-2-methyl acrylate, isopropyl-2-methyl acrylate, or combinations thereof. More preferably, the (meth)acrylic polymer is a polymer prepared using ≥95.0% by weight, more preferably ≥98.0% or ≥99.0% by weight, with regards to the total weight of the monomers used of one or more monomers selected from methyl acrylate, methyl-2-methyl acrylate, butyl-2-methyl acrylate, ethyl acrylate, or combinations thereof. Even more preferably, the (meth)acrylic polymer is a polymer prepared using ≥95.0% by weight, more preferably ≥98.0% or ≥99.0% by weight, with regards to the total weight of the monomers used, of methyl-2-methyl acrylate.

Preferably, the (meth)acrylic polymer is selected from polymethylmethacrylate (PMMA), polybutylmethacrylate (PBMA), poly(methylmethacrylate-ethylacrylate (PMMA-co-EA), polyethyl acrylate (PEA), polybenzyl methacrylate, poly(n-butyl acrylate), poly(t-butyl acrylate), poly(cyclohexyl methacrylate), poly(1,3-dimethylbutyl methacrylate), poly(3,3-dimethylbutyl methacrylate), poly(diphenylethyl methacrylate), poly(diphenylmethyl methacrylate), poly(dodecyl methacrylate), poly(2-ethylbutyl methacrylate), polyethyl methacrylate, poly(trimethylpropyl methacrylate), poly(n-propylmethacrylate), polyphenyl methacrylate, poly(1-phenylethyl methacrylate), polyoctyl methacrylate, polyneopentyl methacrylate, poly(1-methylpentyl methacrylate), polymethylbutyl methacrylate, polylauryl methacrylate, polyisopropyl methacrylate, polyisopentyl methacrylate, or combinations thereof. More preferably, the (meth)acrylic polymer is selected from polymethylmethacrylate (PMMA), polybutylmethacrylate (PBMA), poly(methylmethacrylate-ethylacrylate (PMMA-co-EA), or polyethyl acrylate (PEA). It is preferred that the (meth)acrylic polymer is polymethylmethacrylate (PMMA).

The PMMA may for example have a melt mass flow rate as determined in accordance with ISO 1133-1 (2011), at 230° C. using a load of 3.80 kg, of ≥0.1 and ≤20.0 g/10 min, alternatively ≥0.5 and ≤10.0 g/10 min, alternatively ≥1.0 and ≤5.0 g/10 min. The use of such PMMA in the preparation of a polymer composition according to the invention may for example result in a polymer composition having such flow properties allowing for the production of transparent articles of the polymer composition via injection moulding.

The PMMA may for example have a weight average molecular weight of ≥60000 g/mol, preferably ≥80000 g/mol, more preferably ≥100000 g/mol. The PMMA may for example have a weight average molecular weight of ≤200000 g/mol, preferably ≤150000 g/mol, more preferably ≤125000 g/mol. It is particularly preferred that the PMMA has a weight average molecular weight of ≥60000 and ≤200000 g/mol, more preferably ≥80000 and ≤150000 g/mol, even more preferably ≥100000 and ≤125000 g/mol.

The weight average molecular weight $M_w$ may for example be determined using size-exclusion chromatography using polycarbonate standards, such as for example via the method of ISO 16014-1 (2012).

The polymer composition according to the present invention comprises polycarbonate. Polycarbonate in the context of the present invention may for example relate to polymers or mixtures of polymers comprising polymeric units according to the formula II:

formula II wherein R4 is a moiety comprising at least one aromatic ring. Preferably, at least 60% of the polymeric units in the polycarbonate are units according to formula I. More preferably, at least 80% of the polymeric units in the polycarbonate are units according to formula I. Even more preferably, at least 90%, or at least 95%, or at least 98% of the polymeric units in the polycarbonate are units according to formula I. In a particular embodiment, the polycarbonate is a homopolymer comprising repeating units according to formula I.

In a particular embodiment, R4 is a moiety having a molecular formula R5-R6-R5, wherein each R5 individually is a monocyclic divalent aryl moiety and R6 is a bridging moiety wherein each R5 is bound to the same atom of moiety R6. For example, R6 may be a hydrocarbon moiety, for example a hydrocarbon moiety comprising 1-10 carbon atoms. In a particular embodiment, R6 is a moiety selected from methylene, cyclohexylidene or isopropylidene.

It is particularly preferred that each R5 is phenyl and R6 is isopropylidene.

The polycarbonate that may be used in the polymer composition according to the present invention may for example be produced via interfacial polymerisation processes or via bulk polymerisation processes. The polycarbonate preferably comprises polymeric units comprising moieties derived from 2,2-bis(4-hydroxyphenyl)propane. Preferably, the moieties R4 according to formula II are moieties derived from 2,2-bis(4-hydroxyphenyl)propane.

The polycarbonate may for example have a weight average molecular weight of ≥20000 g/mol, preferably ≥25000 g/mol, more preferably ≥30000 g/mol, more preferably ≥35000 g/mol, more preferably ≥40000 g/mol. The polycarbonate may for example have a molecular weight of ≤100000 g/mol, preferably ≤80000 g/mol, more preferably ≤70000 g/mol, more preferably ≤60000 g/mol. The polycarbonate may for example have a weight average molecular weight of ≥20000 and ≤100000 g/mol, preferably ≥25000 and ≤80000 g/mol, more preferably ≥30000 and ≤80000 g/mol, more preferably ≥35000 and ≤70000 g/mol, more preferably ≥40000 and ≤60000 g/mol. Such polycarbonate provides desirable processing properties combined with desirable properties of the moulded product.

The polycarbonate that is used in the polymer composition according to the present invention is in a particular embodiment a mixture comprising a first polycarbonate and a second polycarbonate. It is preferred that the first polycarbonate has a different weight average molecular weight than the second polycarbonate. It is preferred that the first polycarbonate has a lower weight average molecular weight than the second polycarbonate. This first polycarbonate may for example have a weight average molecular weight of ≥20000 and <50000 g/mol, preferably ≥30000 and ≤45000 g/mol, more preferably ≥35000 and ≤42000 g/mol. The second polycarbonate may for example have a weight average molecular weight of ≥50000 g/mol and ≤100000 g/mol, preferably ≥50000 and ≤80000 g/mol, more preferably ≥52000 and ≤60000 g/mol. It is particularly preferred that the polycarbonate is a mixture comprising a first polycarbonate and a second polycarbonate, wherein the first polycarbonate has a weight average molecular weight of ≥20000 and <50000 g/mol and wherein the second polycarbonate has a weight average molecular weight of ≥50000 g/mol and ≤100000 g/mol. It is further is particularly preferred that the polycarbonate is a mixture comprising a first polycarbonate and a second polycarbonate, wherein the first polycarbonate has a weight average molecular weight of ≥30000 and <45000 g/mol and wherein the second polycarbonate has a weight average molecular weight of ≥50000 g/mol and ≤70000 g/mol. Alternatively, the polycarbonate may be a mixture comprising a first polycarbonate and a second polycarbonate, the first polycarbonate having a weight average molecular weight of less than 45000 g/mol, and second polycarbonate having a weight average molecular weight of at least 50000 g/mol.

The weight average molecular weight $M_w$ may for example be determined using size-exclusion chromatography using polycarbonate standards, such as for example via the method of ISO 16014-1 (2012).

It is preferred that the polymer composition according to the present invention comprises ≥20.0 wt % of polycarbonate, more preferably ≥30.0 wt %, more preferably ≥40.0 wt %, more preferably ≥50.0 wt %, more preferably ≥60.0 wt %, more preferably ≥70.0 wt %, with regard to the total weight of the polymer composition. It is preferred that the polymer composition comprises ≤95.0 wt % of polycarbonate, more preferably ≤90.0 wt %, more preferably ≤85.0 wt %, more preferably ≤80.0 wt %, with regard to the total weight of the polymer composition.

It is particularly preferred that the polymer composition comprises ≥30.0 wt % and ≤95.0 wt % of polycarbonate, more preferably ≥50.0 wt % and ≤90.0 wt %, more preferably ≥60.0 wt % and ≤85.0 wt %, with regard to the total weight of the polymer composition.

In the embodiment of the invention where the polycarbonate is a mixture of a first polycarbonate and a second polycarbonate, the polymer composition comprises ≥10.0 wt % of the first polycarbonate and ≥10.0 wt % of the second polycarbonate, with regard to the total weight of the polymer composition. More preferably, the polymer composition comprises ≥20.0 wt % of the first polycarbonate and ≥20.0 wt % of the second polycarbonate, with regard to the total weight of the polymer composition. Even more preferably, the polymer composition comprises ≥30.0 wt % of the first polycarbonate and ≥30 wt % of the second polycarbonate, with regard to the total weight of the polymer composition. Preferably, the polymer composition comprises ≤45.0 wt % of the first polycarbonate and ≤45.0 wt % of the second polycarbonate, with regard to the total weight of the polymer composition. More preferably, the polymer composition comprises ≤40.0 wt % of the first polycarbonate and ≤40.0 wt % of the second polycarbonate, with regard to the total weight of the polymer composition.

Particularly preferably, the polymer composition comprises ≥10.0 and ≤45.0 wt % of the first polycarbonate, and ≥10.0 and ≤45.0 wt % of the second polycarbonate, with regard to the total weight of the polymer composition. More preferably, the polymer composition comprises ≥30.0 and ≤40.0 wt % of the first polycarbonate, and ≥30.0 and ≤40.0 wt % of the second polycarbonate, with regard to the total weight of the polymer composition.

Further particularly preferably, the polymer composition comprises ≥10.0 and ≤45.0 wt % of the first polycarbonate, and ≥10.0 and ≤45.0 wt % of the second polycarbonate, with regard to the total weight of the polymer composition, wherein the first polycarbonate has a weight average molecular weight of ≥20000 and ≤50000 g/mol and wherein the second polycarbonate has a weight average molecular weight of ≥50000 g/mol and ≤100000 g/mol. More preferably, the polymer composition comprises ≥30.0 and ≤40.0 wt % of the first polycarbonate, and ≥30.0 and ≤40.0 wt % of the second polycarbonate, with regard to the total weight of the polymer composition, wherein the first polycarbonate has a weight average molecular weight of ≥30000 and <45000 g/mol and wherein the second polycarbonate has a weight average molecular weight of ≥50000 g/mol and ≤70000 g/mol.

It is particularly preferred that where the polycarbonate is a mixture of a first polycarbonate and a second polycarbonate, one of the first polycarbonate and the second polycarbonate is produced via interfacial polymerisation. It is further particularly preferred that where the polycarbonate is a mixture of a first polycarbonate and a second polycarbonate, one of the first polycarbonate and the second polycarbonate is produced via melt polymerisation. It is particularly preferred that where the polycarbonate is a mixture of a first polycarbonate and a second polycarbonate, one of the first polycarbonate and the second polycarbonate is produced via interfacial polymerisation and the other of the first polycarbonate and the second polycarbonate is produced via melt polymerisation.

Even further particularly, it is preferred that where the polycarbonate is a mixture of a first polycarbonate and a second polycarbonate, the first polycarbonate has a lower weight average molecular weight than the second polycarbonate, and the first polycarbonate is produced via interfacial polymerisation. It is also particularly preferred that where the polycarbonate is a mixture of a first polycarbonate and a second polycarbonate, the first polycarbonate has a lower weight average molecular weight than the second polycarbonate, and the second polycarbonate is produced via melt polymerisation. It is even further particularly preferred that where the polycarbonate is a mixture of a first polycarbonate and a second polycarbonate, the first polycarbonate has a lower molecular weight than the second polycarbonate, the first polycarbonate is produced via interfacial polymerisation, and the second polycarbonate is produced via melt polymerisation.

In particular, where the polycarbonate is a mixture of a first polycarbonate and a second polycarbonate, it is preferred that the first polycarbonate is produced via interfacial polymerisation and the second polycarbonate is produced via melt polymerisation, wherein the polymer composition comprises ≥10.0 and ≤45.0 wt % of the first polycarbonate, and ≥10.0 and ≤45.0 wt % of the second polycarbonate, with regard to the total weight of the polymer composition. Further particularly, where the polycarbonate is a mixture of a first polycarbonate and a second polycarbonate, it is preferred that the first polycarbonate is produced via interfacial polymerisation and the second polycarbonate is produced via melt polymerisation, wherein the polymer composition comprises ≥30.0 and ≤40.0 wt % of the first polycarbonate, and ≥30.0 and ≤40.0 wt % of the second polycarbonate, with regard to the total weight of the polymer composition.

Even further particularly, where the polycarbonate is a mixture of a first polycarbonate and a second polycarbonate, it is preferred that the first polycarbonate is produced via interfacial polymerisation and the second polycarbonate is produced via melt polymerisation, wherein the polymer composition comprises ≥10.0 and ≤45.0 wt % of the first polycarbonate, and ≥10.0 and ≤45.0 wt % of the second polycarbonate, with regard to the total weight of the polymer composition, the first polycarbonate has a weight average molecular weight of ≥20000 and <50000 g/mol and wherein the second polycarbonate has a weight average molecular weight of ≥50000 g/mol and ≤100000 g/mol. More further particularly, where the polycarbonate is a mixture of a first polycarbonate and a second polycarbonate, it is preferred that the first polycarbonate is produced via interfacial polymerisation and the second polycarbonate is produced via melt polymerisation, wherein the polymer composition comprises ≥30.0 and ≤40.0 wt % of the first polycarbonate, and ≥30.0 and ≤40.0 wt % of the second polycarbonate, with regard to the total weight of the polymer composition, the first polycarbonate has a weight average molecular weight of ≥30000 and <45000 g/mol and wherein the second polycarbonate has a weight average molecular weight of ≥50000 g/mol and ≤70000 g/mol.

The polymer composition according to the present invention further comprises a polyalkylene glycol. Preferably the polyalkylene glycol has a polymeric structure comprising alkylene oxide units having 2-10 carbon atoms.

The one or more polyalkylene glycol having a polymeric structure comprising alkylene oxide units having 2-10 carbon atoms.

For example, the polyalkylene glycol may comprise polymeric units according to formula III:

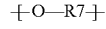  Formula III wherein R7 for example may be a moiety selected from $(CH_2)_2$, $CH_2CH(CH_3)$, $(CH_2)_3$, $CH_2C(CH_3)_2$, or $(CH_2)_4$.

The polyalkylene glycol may for example be one or more selected from polyethyleneglycol, polypropyleneglycol and/or polytetramethyleneetherglycol, such as polyethyleneglycol. The polyalkylene glycol may for example have a number average molecular weight $M_n$ as determined in accordance with ASTM D5296-11 of ≥500 g/mol, alternatively 1000 g/mol, alternatively ≥2000 g/mol, alternatively ≥3000 g/mol. The polyalkylene glycol may for example have a number average molecular weight $M_n$ of ≤8000 g/mol, alternatively ≤6000 g/mol, alternatively ≤5000 g/mol. For example, the polyalkylene glycol may have a number average molecular weight $M_n$ of ≥1000 and ≤8000 g/mol, alternatively ≥2000 and ≤6000 g/mol, alternatively ≥3000 and ≤5000 g/mol. Preferably, the polyalkylene glycol is a polyethyleneglycol having a number average molecular weight of ≥3000 and ≤5000 g/mol.

In a certain embodiment, the present invention relates to a polymer composition comprising:
polycarbonate;
(meth)acrylic polymer; and
≥2.5 and ≤10.0 wt % polyalkylene glycol
with regard to the total weight of the polymer composition.

A further embodiment of the invention relates to a polymer composition comprising:
≥20.0 and ≤77.5 wt % of the polycarbonate;
≥20.0 and ≤77.5 wt % of the (meth)acrylic polymer; and
≥2.5 and ≤10.0 wt % polyalkylene glycol
with regard to the total weight of the polymer composition.

Another further embodiment of the invention relates to a polymer composition comprising:
≥30.0 and ≤67.5 wt % of the polycarbonate;
≥30.0 and ≤67.5 wt % of the (meth)acrylic polymer; and
≥2.5 and ≤6.0 wt % polyalkylene glycol
with regard to the total weight of the polymer composition.

Another further embodiment of the invention relates to a polymer composition comprising:
≥30.0 and ≤69.0 wt % of the polycarbonate;
≥30.0 and ≤69.0 wt % of the (meth)acrylic polymer; and
≥2.5 and ≤4.0 wt % polyalkylene glycol
with regard to the total weight of the polymer composition.

In a further preferred embodiment, the present invention relates to a polymer composition comprising:
≥20.0 and ≤77.5 wt % of the polycarbonate, wherein the polycarbonate has a weight average molecular weight of ≥20000 and ≤100000 g/mol;
≥20.0 and ≤77.5 wt % of the (meth)acrylic polymer, wherein the (meth)acrylic polymer is polymethylmethacrylate having a weight average molecular weight of ≥60000 and ≤200000 g/mol; and
≥2.5 and ≤10.0 wt % polyalkylene glycol wherein the polyalkylene glycol is polyethylene glycol having a number average molecular weight of ≥2000 and ≤6000 g/mol;
with regard to the total weight of the polymer composition.

In an even further preferred embodiment, the present invention relates to a polymer composition comprising:
≥20.0 and ≤77.5 wt % of the polycarbonate, wherein the polycarbonate has a weight average molecular weight of ≥40000 and ≤60000 g/mol;
≥20.0 and ≤77.5 wt % of the (meth)acrylic polymer, wherein the (meth)acrylic polymer is polymethylmethacrylate having a weight average molecular weight of ≥100000 and ≤125000 g/mol; and
≥2.5 and ≤10.0 wt % polyalkylene glycol wherein the polyalkylene glycol is polyethylene glycol having a number average molecular weight of ≥3000 and ≤5000 g/mol;
with regard to the total weight of the polymer composition.

In an even further preferred embodiment, the present invention relates to a polymer composition comprising:
≥20.0 and ≤77.5 wt % of the polycarbonate, wherein the polycarbonate comprises polymeric units comprising moieties derived from 2,2-bis(4-hydroxyphenyl)propane and has a weight average molecular weight of ≥40000 and ≤60000 g/mol;
≥20.0 and ≤77.5 wt % of the (meth)acrylic polymer, wherein the (meth)acrylic polymer is polymethylmethacrylate prepared using ≥95.0% by weight, more preferably ≥98.0% or ≥99.0% by weight, with regards to the total weight of the monomers used, of methyl-2-methyl acrylate, the polymethylmethacrylate having a weight average molecular weight of ≥100000 and ≤125000 g/mol; and
≥2.5 and ≤10.0 wt % polyalkylene glycol wherein the polyalkylene glycol is polyethylene glycol having a number average molecular weight of ≥3000 and ≤5000 g/mol;
with regard to the total weight of the polymer composition.

It is particularly desired that the luminous transmittance as determined in accordance with ASTM D1003 (2000) of the polymer composition according to the present invention is ≥75%, more preferably ≥80%, even more preferably ≥85%.

In a particular embodiment of the invention, the polymer composition is produced by melt extrusion. It is particularly desired that the polymer composition is produced by melt extrusion wherein the extrusion is performed is a melt extruder, for example a single-screw melt extruder or a twin-screw melt extruder, the extruder screw(s) designed to transport and melt thermoplastic material from a first inlet located at one end of the screw(s) towards an outlet located at the other end of the screw(s). Preferably, the melt extruder is equipped to receive a first fraction of the material that is to be extruded at said first inlet and a further fraction of the material that is to be extruded at a second inlet positioned at a location between the first inlet and the outlet of the melt extruder. For example, the second inlet may be positioned at a location between the first inlet and the outlet wherein the distance between the second inlet and the first inlet is greater than the distance between the second inlet and the outlet.

According to the present invention, it is particularly desired that the polymer composition is produced in a melt extrusion process using a melt extruder comprising one or more extruder screws arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder,
wherein at least a fraction of the polyalkylene glycol is introduced into the melt extruder via the second inlet.

Such process results in a reduction of the brittleness of the polymer composition.

It is particularly preferred that also a fraction of the polycarbonate and/or the (meth)acrylic polymer is introduced to the melt extruder via the second inlet. More particularly, it is preferred that a fraction of the (meth)acrylic polymer is introduced to the melt extruder via the second inlet.

In a particular embodiment, the invention relates to a process for the production of a polymer composition by melt extrusion in a melt extruder comprising one or more extruder screws arranged to transport and melt thermoplastic material from a first inlet located at one end of the screw(s) towards an outlet located at the other end of the screw(s), wherein the polymer composition comprises polycarbonate, (meth)acrylic polymer and ≥1.0 and ≤10.0 wt % polyalkylene glycol with regard to the total weight of the polymer composition, wherein the polycarbonate, the (meth)acrylic polymer and the polyalkylene glycol are introduced to the melt extruder via said first inlet. Preferably, the (meth)

acrylic polymer is polymethylmethacrylate. Preferably, the polyalkylene glycol is polyethylene glycol. Preferably, the (meth)acrylic polymer is polymethylmethacrylate and the polyalkylene glycol is polyalkylene glycol. Even more preferably, the (meth)acrylic polymer is polymethylmetacrylate and the polyalkylene glycol is polyethylene glycol having a number average molecular weight of ≥2000 and ≤6000 g/mol.

In another particular embodiment, the invention relates to a process for production of a polymer composition by melt extrusion in a melt extruder comprising one or more extruder screws arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder, comprising the steps of:
- introducing ≥20.0 and ≤79.5 parts by weight of polycarbonate to the melt extruder via the first inlet;
- introducing ≥20.0 and ≤79.5 parts by weight of (meth)acrylic polymer and ≥1.0 and ≤10.0 parts by weight of polyalkylene glycol to the melt extruder via the second inlet; and
- removing the polymer composition from the outlet;
- wherein the sum of the weight parts of the polycarbonate, the (meth)acrylic polymer and the polyalkylene glycol equals 100 weight parts.

In an alternative embodiment, the invention relates to a process for production of a polymer composition by melt extrusion in a melt extruder comprising one or more extruder screws arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder, comprising the steps of:
- introducing ≥20.0 and ≤79.5 parts by weight of (meth)acrylic polymer to the melt extruder via the first inlet;
- introducing ≥20.0 and ≤79.5 parts by weight of polycarbonate and ≥1.0 and ≤10.0 parts by weight of polyalkylene glycol to the melt extruder via the second inlet; and
- removing the polymer composition from the outlet;
- wherein the sum of the weight parts of the polycarbonate, the (meth)acrylic polymer and the polyalkylene glycol equals 100 weight parts.

Particularly preferably, the (meth)acrylic polymer is polymethylmethacrylate. Even further particularly preferably, the (meth)acrylic polymer is polymethylmethacrylate and the polyalkylene glycol is polyethylene glycol. Even more preferable, the (meth)acrylic polymer is polymethylmethacrylate and the polyalkylene glycol is polyethyleneglycol a number average molecular weight of ≥3000 and ≤5000 g/mol.

In a further particular embodiment, the invention relates to a process for production of a polymer composition by melt extrusion in a melt extruder comprising one or more extruder screws arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder, comprising the steps of:
- introducing ≥30.0 and ≤69.5 parts by weight of polycarbonate to the melt extruder via the first inlet;
- introducing ≥30.0 and ≤69.5 parts by weight of (meth)acrylic polymer and ≥1.0 and ≤10.0 parts by weight of polyalkylene glycol to the melt extruder via the second inlet; and
- removing the polymer composition from the outlet;
- wherein the sum of the weight parts of the polycarbonate, the (meth)acrylic polymer and the polyalkylene glycol equals 100 weight parts.

In an further alternative embodiment, the invention relates to a process for production of a polymer composition by melt extrusion in a melt extruder comprising one or more extruder screws arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder, comprising the steps of:
- introducing ≥30.0 and ≤68.5 parts by weight of (meth)acrylic polymer to the melt extruder via the first inlet;
- introducing ≥30.0 and ≤69.0 parts by weight of polycarbonate and ≥2.5 and ≤10.0 parts by weight of polyalkylene glycol to the melt extruder via the second inlet; and
- removing the polymer composition from the outlet;
- wherein the sum of the weight parts of the polycarbonate, the (meth)acrylic polymer and the polyalkylene glycol equals 100 weight parts.

In a specific embodiment, the invention also relates to a polymer composition comprising:
- polycarbonate;
- (meth)acrylic polymer; and
- ≥1.0 and ≤10.0 wt % polyalkylene glycol
- with regard to the total weight of the polymer composition
- wherein the polycarbonate and the (meth)acrylic polymer are the only polymer materials in the polymer composition.

Particularly, the invention further also relates to a polymer composition comprising:
- polycarbonate;
- (meth)acrylic polymer; and
- ≥1.0 and ≤10.0 wt % polyalkylene glycol
- with regard to the total weight of the polymer composition
- wherein the polycarbonate and the (meth)acrylic polymer are the only polymer materials in the polymer composition, and wherein the (meth)acrylic polymer is
polymethylmethacrylate.

Further particularly, an embodiment of the invention relates to a polymer composition comprising:
- polycarbonate, preferably ≥30.0 and ≤49.0 wt %;
- ≥50.0 and ≤70.0 wt % (meth)acrylic polymer; and
- ≥1.0 and ≤10.0 wt %, preferably ≥2.0 and 5.0 wt %, polyalkylene glycol
- with regard to the total weight of the polymer composition;
- wherein the (meth)acrylic polymer is polymethylmethacrylate.

Such composition is understood to provide a particularly desirable balance of a high heat deflection temperature (HDT), low residual scratch depth, low scratch width and good transparency, transmission and haze properties.

The invention will now be illustrated by the following non-limiting examples.

Materials:
PC: Lexan 141, obtainable from SABIC, a polycarbonate having an $M_w$ of 42000 g/mol;
PMMA: SABIC 20HR, obtainable from SABIC, a polymethylmethacrylate having an $M_w$ of 107000 g/mol;
PEG: PEG4000, obtainable from Hi Media, a polyethyleneglycol having an $M_n$ of 4000 g/mol.

In a ZSL25 25 mm twin-screw extruder, operated at 260° C. and 200 rpm, formulations according to table I were subjected to melt extrusion to obtain polymer compositions.

TABLE I

| | formulations | | | | | |
|---|---|---|---|---|---|---|
| Example | 1 | 2 | 3* | 4* | 5* | 6* |
| PC | 68.0 | 30.0 | | 100.0 | 30.0 | 70.0 |
| PMMA | 30.0 | 66.0 | 100.0 | | 70.0 | 30.0 |
| PEG | 2.0 | 4.0 | | | | |

The quantities presented in table I represent parts by weight.
Example 3-6 (marked *) are included for comparative purposes.

Of the polymer compositions that were obtained according to the examples 1-6, a set of material properties was determined as presented in table II.

TABLE II

| | Material properties | | | | | |
|---|---|---|---|---|---|---|
| Example | 1 | 2 | 3* | 4* | 5* | 6* |
| Appearance | | T | T | T | O | O |
| Transmission | 85 | 87 | 86 | 88 | | |
| Haze | 15 | 6 | 8 | 4 | | |
| HDT | 108 | 108 | 99 | 132 | 88 | 109 |
| Scratch width | 26.8 | 22.6 | 20.2 | 34.2 | 23.6 | 28.5 |
| Residual depth | 1.8 | 1.5 | 1.3 | 2.6 | 1.6 | 1.9 |
| Hardness | 0.19 | 0.21 | 0.23 | 0.15 | 0.20 | 0.19 |
| Izod | 28 | 28 | 22 | | | |
| $M_w$ | | 64.7 | 108.9 | 42.0 | 77.3 | |
| $M_n$ | | 11.4 | 58.0 | 19.2 | 28.6 | |
| $M_w/M_n$ | | 5.7 | 1.9 | 2.2 | 2.7 | |

Wherein:
Appearance is the appearance as determined by visual observation of test plaques obtained by injection moulding of a sample of the polymer compositions that were dried at 80° C. for 6 hrs, using a LT Demag 60 injection moulding machine at a temperature of 250° C. with a screw speed of 100 rpm, and a mould temperature of 70° C. T indicates transparent, 0 indicates opaque. The above data show that the polymer composition according to the present invention of example 2, comprising a PEG compatibiliser, results in transparent plaques, whereas the uncompatibilised composition of example 5 results in opaque plaques.

Transmission is the luminous transmittance as determined in accordance with ASTM D1003 (2000), expressed in %.

Haze was determined in accordance with ASTM D1003 (2000), and expressed in %.

HDT is the heat deflection temperature as determined in accordance with ASTM D648 (2016) using samples of 6.4 mm under a load of 1.82 MPa, expressed in ° C.

Hardness is determined in as the indentation hardness in accordance with ISO 14577-1 (2015). Hardness was determined using a Berkovich indenter with a tip diameter of 20 nm. Indentations were made with a constant strain rate of $0.05~s^{-1}$ and indentation depth of 2 μm. Hardness is expressed in GPa. The above data show that the polymer formulation according to the invention of example 2 has a far greater hardness than the polycarbonate of example 4.

Residual depth is the depth of scratches induced by the nano-scratching method as determined in accordance with ASTM D7187 (2010). Nano-scratch testing was done with an increased load of 0-120 mN using a Berkovich indenter with a tip diameter of 50 nm. Depth was measured at a load of 48 mN. Residual depth is expressed in μm.

Scratch width is the width of scratches induced by the nano-scratching method as determined in accordance with ASTM D7187 (2010). Nano-scratch testing was done with an increased load of 0-120 mN using a Berkovich indenter with a tip diameter of 50 nm. Scratch width is expressed in μm.

Izod is the unnotched Izod impact strength as determined according to ISO 180 (2000), condition U at 23° C., expressed in $kJ/m^2$.

$M_w$ is the weight average molecular weight, $M_n$ is the number average molecular weight, expressed in kg/mol, determined using size-exclusion chromatography using polycarbonate standards via the method of ISO 16014-1 (2012).

The invention claimed is:

1. A polymer composition comprising:
   ≥20.0 and ≤77.5 wt % of a polycarbonate;
   ≥20.0 and ≤77.5 wt % of a (meth)acrylic polymer; and
   ≥2.5 and ≤10.0 wt % of a polyalkylene glycol;
   with regard to the total weight of the polymer composition.

2. The polymer composition according to claim 1, comprising:
   ≥30.0 and ≤67.5 wt % of the polycarbonate;
   ≥30.0 and ≤67.5 wt % of the (meth)acrylic polymer; and
   ≥2.5 and ≤6.0 wt % of the polyalkylene glycol;
   with regard to the total weight of the polymer composition.

3. The polymer composition according to claim 1, comprising:
   ≥30.0 and ≤69.0 wt % of the polycarbonate;
   ≥30.0 and ≤69.0 wt % of the (meth)acrylic polymer; and
   ≥2.5 and ≤4.0 wt % of the polyalkylene glycol;
   with regard to the total weight of the polymer composition.

4. The polymer composition according to claim 1, wherein the (meth)acrylic polymer is selected from polymethylmethacrylate, polybutylmethacrylate, poly(methylmethacrylate-ethylacrylate), polyethyl acrylate, polybenzyl methacrylate, poly(n-butyl acrylate), poly(t-butyl acrylate), poly(cyclohexyl methacrylate), poly(1,3-dimethylbutyl methacrylate), poly(3,3-dimethylbutyl methacrylate), poly(diphenylethyl methacrylate), poly(diphenylmethyl methacrylate), poly(dodecyl methacrylate), poly(2-ethylbutyl methacrylate), polyethyl methacrylate, poly(trimethylpropyl methacrylate), poly(n-propylmethacrylate), polyphenyl methacrylate, poly(1-phenylethyl methacrylate), polyoctyl methacrylate, polyneopentyl methacrylate, poly(1-methylpentyl methacrylate), polymethylbutyl methacrylate, polylauryl methacrylate, polyisopropyl methacrylate, polyisopentyl methacrylate, or combinations thereof.

5. The polymer composition according to claim 1, wherein the (meth)acrylic polymer is polymethylmethacrylate.

6. The polymer composition according to claim 1, wherein the polyalkylene glycol is selected from polyethyleneglycol, polypropyleneglycol and/or polytetramethyleneetherglycol.

7. The polymer composition according to claim 1, wherein the polyalkylene glycol is polyethyleneglycol.

8. The polymer composition according to claim 1, wherein the polyalkylene glycol has a number average molecular weight of ≥2000 and ≤6000 g/mol.

9. A process for the production of the polymer composition according to claim 1, by melt extrusion of the polycarbonate, the (meth)acrylic polymer and the polyalkylene glycol in a melt extruder.

10. A process for the production of a polymer composition, by melt extrusion of a polycarbonate, a (meth)acrylic polymer, and a polyalkylene glycol in a melt extruder, wherein the melt extruder comprises an extruder screw(s) arranged to transport and melt thermoplastic material from a first inlet located at one end of the screw(s) towards an outlet located at the other end of the screw(s), the melt extruder being equipped to receive a first fraction of the material that is to be extruded at a first inlet and a further fraction of the material that is to be extruded at a second inlet positioned at a location between the first inlet and the outlet of the melt extruder, wherein at least a fraction of the polyalkylene glycol is introduced into the melt extruder via the second inlet; and wherein the polymer composition comprises: the polycarbonate; the (meth)acrylic polymer; and ≥1.0 and ≤10.0 wt % of the polyalkylene glycol; with regard to the total weight of the polymer composition.

11. The process according to claim 10, wherein a fraction of the (meth)acrylic polymer is introduced to the melt extruder via the second inlet.

12. The process according to claim 10, comprising the steps of:
    introducing ≥30.0 and ≤69.5 parts by weight of the polycarbonate to the melt extruder via the first inlet;
    introducing ≥30.0 and ≤69.5 parts by weight of ≥(meth)acrylic polymer and 1.0 and ≤10.0 parts by weight of polyalkylene glycol to the melt extruder via the second inlet; and
    removing the polymer composition from the outlet;
    wherein the sum of the weight parts of the polycarbonate, the (meth)acrylic polymer and the polyalkylene glycol equals 100 weight parts.

13. The process according to claim 10, comprising the steps of:
    introducing ≥30.0 and ≤68.5 parts by weight of the polycarbonate to the melt extruder via the first inlet;
    introducing ≥30.0 and ≤69.0 parts by weight of ≥(meth)acrylic polymer and 2.5 and ≤10.0 parts by weight of polyalkylene glycol to the melt extruder via the second inlet; and
    removing the polymer composition from the outlet;
    wherein the sum of the weight parts of the polycarbonate, the (meth)acrylic polymer and the polyalkylene glycol equals 100 weight parts.

* * * * *